Patented Dec. 21, 1937

2,102,627

UNITED STATES PATENT OFFICE 2,102,627

ZIRCONIUM OXIDE VITREOUS ENAMEL OPACIFIER

Charles J. Kinzie, Niagara Falls, N. Y., assignor to The Titanium Alloy Manufacturing Company, New York, N. Y., a corporation of Maine No Drawing. Application August 7, 1935, Serial No. 35,040

11 Claims. (Cl. 106—36.2)

My invention relates generally to the production of pigmenting or opaquing compounds composed chiefly of zirconium oxide for use in vitreous enamels and in other glass products that will have high opaquing values, and its objects comprise improved methods for eliminating the impurities that would discolor the final enamel so as to render the latter of the desired whiteness and opacity.

The increasing importance of zirconia or zirconium oxide as an opacifier in lieu of tin oxide, antimony oxide, etc., in enamelling, has recently stimulated invention of various processes for more perfectly concentrating or separating it from such, for some purposes, undesirable, impurities, for example silicon, iron, titanium, etc., or their compounds more or less of which respectively are usually found associated therewith as in the natural ores.

My invention relates more particularly to the derivation of high opacity zirconium oxide from zirconium oxides resulting from the electrothermal decomposition of zircon ($ZrSiO_4$), into zirconium intermediates, such as zirconium cyanonitrides, carbides or carboxides, and then calcining same to the oxide in contact with oxygen.

Zirconium oxides produced by such methods contain impurities such as silicon carbide and other carbides which render same unsuited for vitreous enamel opaquing purposes as well as for paint and lacquer pigment purposes.

In case of vitreous enamels, glazes, etc., the zirconium oxide containing such impurities yield enamels having a grayish color and poor gloss, while in paints and lacquers such impure $ZrO_2$ products could not impart a white pigmenting.

In this enameling art relative percentage opacity readings by which the degree of opacification is now determined for enamels by the reflectance test are obtained through the use of instruments known as opacimeters. Such opacimeters are in general use in the ceramic industry, and certain standards have been set up where the enameled article has two coats of enamel successively applied and fired. An opacity reading of 52½ represents an enamel with no mill addition of opaquing agents except the usual clay, and was used in my herein described tests as a standard of comparison for white enamels.

The differences between the various opacifiers used as hereinafter described may be determined by the use of a less opaque or a more opaque frit. If a less opaque frit about 6 to 10% of the mill addition of the opacifier would be used, while with a more opaque frit from 2 to 6%.

In the following examples of my improved methods where I refer to opacity readings, I refer to readings made with the usual opacimeters made on enameled specimens having the white test enamel applied successively in two coats and then fired.

The test enamel used was one having the following characteristics:

When milled with no mill addition of opacifier, that is with only 6 percent clay, and applied at rate of 72 grams per sq. ft. total in two coats, and then fired two and one-half minutes at 1500° F., an opacity reading of 52½ was obtained.

This enamel, used for illustrative purposes, is a typical general purpose cover coat enamel for the vitreous enameling of sheet iron.

When 6% of tin oxide was added to such enamel at mill along with the clay and then applied and burned two and one-half minutes at 1500° F., an opacity reading of 71½ was obtained.

I have now discovered improved methods by means of which the opacifying effect of zirconium oxide is greatly increased, and I believe the improved zirconium oxide product derived therefrom constitutes a discovery of great importance particularly when used in the vitreous enameling as a mill addition opacifier.

There are now available enamel frits, which, in contrast with a basic opacity of 52½ for that of the aforesaid typical general purpose enamel, have opacity readings as high as 80 with only 6% clay as the mill addition when applied in two coats at total rate of 72 grams per square foot. When 6% of my new zirconium oxide opacifier products is added to such a basically superopaque frit at the mill, and then applied at rate of 72 grams per square foot, opacity readings in the neighborhood of 85 to 90 or more may be produced.

Such enamels are not normally applied at 72 grams per square foot, but are usually applied over the dark ground coat in one coat only at rate of about 40 to 55 grams per square foot as two coat work total rate 40 to 55 grams per square foot. With such superopaque enameling frits, a greater mill addition opacity is produced with my new zirconium oxide opacifier than was ever before known, thus resulting in either more opaque enamels, or enamels of normal opacity obtained by use of thinner enamel coatings.

The following examples represent complete descriptions of my new product and how same may be made starting from zirconium oxide having unsuitable opacifying characteristics.

*Example A.*—The material to be treated by my method, as for example raw or natural ores, sands, etc. containing zirconium, or its compounds, is preferably preliminarily purified from iron, titanium, or other undesired components to such extent as can be by aid of any hitherto known method, and its zirconium constituents are also preferably, when possible, converted into that form or compound which I particularly prefer for my purposes and which is known as "zirconium cyanonitride," being the product described and claimed in Letters Patent No. 1,342,084, granted to Louis E. Barton, June 1st, 1920, and, as therein described, obtained by aid of melting the zirconium-containing material with a carbonaceous reducing agent to production of said zirconium cyanonitride.

The material to be treated (said zirconium cyanonitride for example) and which, though preferably purified as above referred to, still contains more iron and other impurities than are desirable, or are prohibitory for certain uses, I preferably crush, and further mill to fine powder, for example, such as to pass a 300 mesh screen.

This milled material I mix with cold sulphuric acid about 93% strength, using about 2.85 parts acid to one of the cyanonitride and the cold mixture I charge cautiously into an iron pan or other suitable vessel previously heated to about 200° C. As the liquid mix comes in contact with the pan a vigorous reaction occurs by which the zirconium compounds, say the cyanonitride, are converted, to large extent, into zirconium sulphate. The resulting porous cake I heat at a temperature of about 300° C., for a period of say 2 hours or until over 95% of the total zirconium in the batch has been converted into water soluble zirconium sulphate; I find that if the batch is stopped shortly after reaction only about 75% of the zirconium will dissolve in water.

The resulting mass I charge directly after baking, while hot, into cold water, or I cool and dissolve it in cold or warm water. I prefer to charge the cake while warm or hot into cold water so regulating the addition of cake as to avoid too vigorous boiling of the solution. The cake is extremely soluble and no external heat need be applied. I finally adjust the strength of the charge as may be indicated and let it settle until the insoluble silicious and other material settles out, leaving a clear zirconium sulphate solution, which, in a typical case in which zirconium cyanonitride was the material treated, gave by analysis the following:

| | | Percent |
|---|---|---|
| Zirconium oxide | $ZrO_2$ | 9.80 |
| Ironoxid calc. to $Fe_2O_3$ | $Fe_2O_3$ | 0.045 |
| Titanium oxide calc. to $TiO_2$ | $TiO_2$ | 0.048 |
| Total sulphates calc. to $H_2SO_4$ | $H_2SO_4$ | 18.35 |
| Water free or combined | $H_2O$ | 71.757 |
| | | 100.00 |

Taking 1000 grams of the said solution I evaporated it at temperature of 100–300° C. until the water was expelled to sufficient extent to form a solid cake. I then placed the charge in a furnace and gradually raised the temperature until all combined sulphuric acid was driven out, this requiring continued heating at about 900° C. for several hours. I thus finally obtained a zirconium oxide free from sulphuric acid. This product was cream to reddish in tone. I then cooled and pulverized it, it being of very soft and fluffy nature the breaking down proved easy. The dry zirconium oxide I then charged into a beaker with 100 cc. hydrochloric acid (1.11 sp. gr.), and digested the mixture at 90–95° C. for 2 hours, diluted it to 500 cc. and filtered, washed, dried, and calcined it.

My resulting product, consisting essentially of zirconium oxide, yielded by analysis the following, viz:

| | | Percent |
|---|---|---|
| Zirconium oxide | $ZrO_2$ | 98.19 |
| Titanium oxide | $TiO_2$ | 0.25 |
| Iron oxide | $Fe_2O_3$ | 0.10 |
| Aluminum oxide | $Al_2O_3$ | 0.80 |
| Silicon oxide | $SiO_2$ | 0.56 |

Its specific gravity (density) was 5.233; its oil absorbing capacity, 28.63%; its hiding power (opacity) about 49%.

It is required about 15% thereof (by weight) for it to produce opacity in enamel for sheet steel. Its color was light cream.

When the zirconium oxide referred to in this analysis was used, 6% at the mill, in typical sheet iron cover coat enamel according to procedure hereinbefore described, the enamel gave an opacity reading of only 52, thereby showing that the product is of no value as an opacifier.

From this relatively pure zirconium oxide, which is valueless from vitreous enamel opacifying standpoint, I have discovered a novel and improved process which will produce my new product now to be described.

I form a charge made up as follows:

| | Parts by weight |
|---|---|
| Zirconium oxide | 100 |
| Sodium carbonate | 11.55 |
| | 111.55 |

The charge was first intimately dry mixed by any suitable means which will bring the sodium carbonate particles into intimate contact with the $ZrO_2$ particles.

The mixed charge was then heated at about 950° C. for four hours, cooled, and subjected to a mild disintegration to form a powder having the following approximate composition by chemical analysis:

| | Percent |
|---|---|
| $ZrO_2$ | 92.30 |
| $SiO_2$ | 0.40 |
| $TiO_2$ | 0.20 |
| $Fe_2O_3$ | 0.10 |
| $Na_2O$ | 6.30 |
| Others—$Al_2O_3$, etc | 0.70 |
| | 100.00 |

This product when used, 6 percent at the mill, I found to have produced vitreous enamel having an opacity reading of 65½, thereby showing that by this simple method of heating with a small amount of sodium carbonate the low opacity zirconium oxide product has been altered.

For some purposes it may be desirable to remove the water soluble sodium salts present. In this event the roasted product is washed with water to yield a product of the following composition by chemical analysis:

| | Percent |
|---|---|
| $ZrO_2$ | 96.66 |
| $SiO_2$ | 0.30 |
| $TiO_2$ | 0.20 |
| $Fe_2O_3$ | 0.10 |
| $Na_2O$ | 1.28 |
| Others, $Al_2O_3$ ignition loss, etc. | 1.46 |
| | 100.00 |

This product when used, 6 percent as a mill addition, in typical enamel standard procedure produced an opacity reading of 67. There was no visually discernible difference in the opacifying result as compared with the unwashed product but a vast difference when compared with the original 98.19 percent $ZrO_2$ from which my high opacity products were formed.

*Example B.*—In this example an entirely different type of zirconium oxide was used as the starting material that was obtained by the oxidation of zirconium cyanonitride produced as described in U. S. Patent No. 1,342,084 to L. E. Barton dated June 1st, 1920.

The oxidized zirconium cyanonitride was first wet milled in a silex-lined mill with flint pebbles to particle size of about two microns and finer, and then was dried to produce a zirconium oxide of the following composition by chemical analysis.

| | Percent |
|---|---|
| $ZrO_2$ | 94.15 |
| SiC | 0.50 |
| $SiO_2$ | 4.00 |
| $Fe_2O_3$ | 0.10 |
| $TiO_2$ | 0.25 |
| Others, $Al_2O_3$ etc. | 1.00 |
| | 100.00 |

When this finely ground $ZrO_2$ containing objectionable impurities was used, 6 percent at the mill, in typical enamel standard procedure, the resulting enamel had an opacity reading of 50 and the surface was badly pitted with the enamel having a decided gray coloring.

In order to convert this unsatisfactory zirconium oxide to a high capacity opacifier, I proceeded in the following manner.

I first made a charge parts by weight as follows:

| | Parts by weight |
|---|---|
| Zirconium oxide (above) | 100 |
| Sodium carbonate | 10 |
| Sodium nitrate | 2.5 |
| | 112.5 |

The charge was intimately dry-ground to bring the alkali-metal compound particles into intimate contact with the fine zirconium particles, and then heated at temperatures from 850 to 900° C. for about four hours, during which treatment the silicon carbide was oxidized and destroyed, while the zirconium oxide particles were altered to a condition capable of producing highly lustrous, high opacity vitreous enamel finishes when added at the mill.

This product I found to be of the following composition by chemical analysis and was after roasting a cream colored powder requiring no further treatment to produce satisfactory opacifying effects.

| | Percent |
|---|---|
| $ZrO_2$ | 87.60 |
| $SiO_2$ | 5.08 |
| $TiO_2$ | 0.24 |
| $Fe_2O_3$ | 0.13 |
| $Na_2O$ | 5.95 |
| Others, $Al_2O_3$, etc. | 1.00 |
| | 100.00 |

When this product was used, 6 per cent at the mill according to the standard enameling procedure which I have described, the resultant enamel was a good match for 6 percent tin oxide of modern high opacity standard, the zirconium oxide product having an opacity reading of 71, while tin oxide gave enameling reading 71½. Both had about same white color tone, lustre and general opacifying and coloring characteristics.

The optional water washing step referred to in Example A, when applied to roasted product of this Example B produced a product of the following composition.

| | Percent |
|---|---|
| $ZrO_2$ | 88.06 |
| $SiO_2$ | 5.18 |
| $TiO_2$ | 0.25 |
| $Fe_2O_3$ | 0.12 |
| $Na_2O$ | 4.89 |
| Others—$Al_2O_3$, ignition loss, etc. | 1.50 |
| | 100.00 |

This water washed alternative product of Example B when used, 6 percent at the mill according to my hereinbefore described standard enameling procedure, produced an enamel with an opacity reading of 71½. This result was essentially the same as with the roasted product when used direct.

*Example C.*—In this example I used zirconium oxide described as being a gray colored material in the pending Kinzie and Hake application for patent Serial No. 713,537 filed March 1st, 1934 which had the following composition by chemical analysis:

| | Percent |
|---|---|
| $ZrO_2$ | 99+ |
| $TiO_2$ | 0.14 |
| Iron $Fe_2O_3$ | 0.005 |
| Carbon | 0.10 |

This gray-colored material was obtained from high temperature decomposition of zircon not in intimate contact with carbon in an electric resistance furnace with substantially complete expulsion of silicon and iron compounds.

The above composition is used as the starting material and was wet milled in an iron or rubber lined mill with iron balls to fineness of two microns or finer, then acid treated to remove iron, washed and dried. The charge was made up consisting of

| | Parts by weight |
|---|---|
| Milled $ZrO_2$ | 100.00 |
| Sodium carbonate | 10.00 |
| Sodium nitrate | 2.50 |
| | 112.50 |

The charge was well mixed and ground to bring the alkali metal particles into intimate contact with the zirconium oxide particles, and then the mixture was roasted at 850–900° C. for four hours.

The product in form of a powder was of the following composition by chemical analysis:

| | Percent |
|---|---|
| $ZrO_2$ | 92.91 |
| $SiO_2$ | 0.30 |
| $TiO_2$ | 0.11 |
| $Fe_2O_3$ | 0.03 |
| $Na_2O$ | 5.90 |
| Others, $Al_2O_3$, etc. | 0.75 |
| | 100.00 |

This product when used directly from the roasting operation, 6 percent at the mill, and in the enameling procedure I have described gave an opacity reading of 72½, and visually the enamel was slightly more opaque than the 6 percent tin oxide enamel.

By milling the roasted product with 50 percent water a few hours (three) in a porcelain ball mill, and washing out the soluble sodium salts and then drying the product at 150–200° C., a product was produced having the following composition by chemical analysis:

| | Percent |
|---|---|
| $ZrO_2$ | 97.45 |
| $SiO_2$ | 0.25 |
| $TiO_2$ | 0.12 |
| $Fe_2O_3$ | 0.03 |
| $Na_2O$ | 0.90 |
| Others, $Al_2O_3$, etc. ignition loss | 1.25 |
| | 100.00 |

This product tested 6 percent at mill by the hereinbefore described enameling procedure gave an opacity reading of 73½, with the enamel noticeably more opaque than the enamel containing 6 percent tin oxide.

*Example D.*—In a companion case filed by Donald S. Hake and myself August 7, 1935, Serial No. 35,041, there are described improved methods of forming from zirconium carboxide a zirconium oxide of exceptional low bulking characteristics such zirconium carboxide having approximately the following composition:

| | Percent |
|---|---|
| Zirconium | 80 |
| Carbon | 11 |
| Oxygen | 9 |
| | 100 |

This zirconium carboxide was then calcined at about 1500° F. when it oxidized with glowing and expanded several times in volume to form extremely fine crystalline zirconium oxide particles, free from silicon carbide or other silicon compounds, and contained $TiO_2$ about 0.10% and $Fe_2O_3$ about 0.01%.

Such $ZrO_2$ product had a refractive index from 2.3 to 2.4. The major constituent is a zirconium oxide of no apparent birefringence, when subjected to microscopic examination and these zirconium oxide particles consist of elongated prisms averaging five to six times in length as in cross-section with no distinct cleavage being visible. This $ZrO_2$ product has a specific gravity ranging from 4.6 to 4.9.

This zirconium oxide as so produced from zirconium carboxide was a light buff colored, low bulking $ZrO_2$. When used, 6 percent at the mill according to standard enamel procedure, it gave an opacity reading of 76. However, there had occurred an energetic reaction between the enamel and opacifier resulting in a marked increase in volume of the enamel surface, the whole of which was filled with gas bubbles in various stages of development, some of which burst and opened. Although the effect might be useful as a special finish, for most purposes a dense lustrous surface is required.

However when I formed a charge composed of
  100   parts of this low bulk $ZrO_2$
   10   parts sodium carbonate
    2½  parts sodium nitrate
which were intimately mixed to bring all the particles into intimate contact and then heated four hours at 900° C., there resulted with no further treatment a light, fluffy and free-flowing powder containing by chemical analysis:

| | Percent |
|---|---|
| $ZrO_2$ | 92.99 |
| $SiO_2$ | 0.20 |
| $TiO_2$ | 0.09 |
| $Fe_2O_3$ | 0.02 |
| $Na_2O$ | 6.20 |
| Others | 0.50 |
| | 100.00 |

It is important to note that this product was produced directly from the low bulking $ZrO_2$, and that no milling was involved except the step of intimately mixing the alkali compounds with the $ZrO_2$ and in this mixing the $ZrO_2$ particles were not reduced as to size.

As I will hereinafter show the bulk of 6.2 percent $Na_2O$ is water-soluble, but for some enamel mill addition purposes this is not objectionable, and the product may be packed directly from the roasting operation and used at the mill. In a test following the standard enameling procedure, using 6 percent at the mill, an enamel was produced having a very high lustre and a degree of opacity visually much greater than the best tin oxide and greater than any hitherto known zirconium oxide and was capable at the same time of producing a lustrous surface. The opacity reading was 74½; in comparison 6 percent tin oxide produced an enamel with an opacity reading of 71½.

For some purposes the presence of the water-soluble sodium compounds is objectionable; upon washing out of this material by milling with 60 percent water for three hours and then washing and drying, a zirconium oxide product of the following composition by chemical analysis was obtained:

| | Percent |
|---|---|
| $ZrO_2$ | 97.87 |
| $SiO_2$ | 0.30 |
| $TiO_2$ | 0.12 |
| $Fe_2O_3$ | 0.01 |
| $Na_2O$ | 0.70 |
| Others, including ignition loss | 1.00 |
| | 100.00 |

This product when tested, 6 percent at the mill, according to the standard enameling procedure produced a highly lustrous, highly opaque enamel having an opacity reading of 75½.

The enamel appeared slightly more opaque as compared with the one produced from roasted product containing the 6.2 percent $Na_2O$ which might be expected, since the $ZrO_2$ was increased in percentage from 92.99 to 97.87%. The enamel was much more opaque than corresponding tin oxide enamel.

The following table will show the results obtained by varying the amounts of sodium compounds used.

| Example | E | F | G | H | I | J | K | L |
|---|---|---|---|---|---|---|---|---|
| Type-Zirconia used in examples E to L inclusive was that of Example B. | | | | | | | | |
| Zirconia—parts by weight | 1000 | 1000 | 1000 | 1000 | 1000 | 1000 | 1000 | 1000 |
| Sodium carbonate—parts by weight | 860 | 600 | 400 | 200 | 100 | 100 | None | 70 |
| Sodium nitrate—parts by weight | None | 25 | 25 | 25 | 25 | 25 | 185 | 25 |
| Temperature °C. of roasting | 950 | 950 | 950 | 950 | 950 | 1000 | 800 | 900 |
| Time, hrs. of roasting | 4 | 4 | 4 | 4 | 4 | 4 | 4 | 4 |

*Composition of roast*

| | E | F | G | H | I | J | K | L |
|---|---|---|---|---|---|---|---|---|
| $ZrO_2+$ | 63 | 70 | 76.5 | 84.3 | 89 | 89 | 89 | 90.32 |
| $Na_2O$ | 34 | 26.25 | 19.5 | 11.2 | 6.3 | 6.3 | 6.3 | 4.44 |
| $SiO_2$ | 3 | 3.75 | 4.0 | 4.5 | 4.7 | 4.7 | 4.7 | 4.68 |
| Opacity of 6 percent enamel | E, F, G, H, and L not determined. | | | | 71 | 66 | 71 | |

*Composition of product after washing and drying 150° C.*

| | E | F | G | H | I | J | K | L |
|---|---|---|---|---|---|---|---|---|
| $ZrO_2+$ | 89.46 | 89 | 89 | 89 | 90 | 90 | 90.18 | 91.28 |
| $Na_2O$ | 5.30 | 5.60 | 5.40 | 5.60 | 4.89 | 4.89 | 4.04 | 3.62 |
| $SiO_2$ | 5.24 | 5.20 | 5.20 | 5.20 | 5.18 | 5.18 | 5.00 | 4.70 |
| Opacity of 6 percent enamel | 70 | 71 | 71 | 72 | 72 | 68 | 72 | 69½ |

In all above cases where the opacity reading is within the range 70 to 72 the enamels were practically duplicates of enamel containing 6 percent tin oxide having reading of 71½.

In Examples E to H, no enameling tests were attempted with the roasted products before washing due to the relatively large amount of alkali present which would interfere with good enamel practice.

In washing it was noted that products of Examples E, F and G gave trouble in washing, and several days were required to settle out the colloidal material formed. This was a decided disadvantage, and, based on the results, the use of the large amounts of alkali are not only wasteful, but detrimental, since it becomes imperative to remove the excess sodium and such removal is difficult due to colloid formation.

Example H is apparently the border line of good practice, while Example I represents the preferred procedure.

Example J shows the effect of overheating the charge, which serves to alter the product so as to form less opacity than in products made from lower temperature roasts.

Example K shows that sodium nitrate alone, when used in amount to supply the $Na_2O$ equivalent of Example I, produces at 800° C. a product of equal opacifying effects as compared with the $Na_2CO_3+NaNO_3$ mix of Example I. 800° C. is too low a temperature except when the bulk of the reactive agent is sodium nitrate.

Example L shows that the amount of $Na_2CO_3$ and $NaNO_3$ is not enough, even though theoretically the amount should yield a product of about same composition as in Example B. A slight surplus of the alkali reagents is probably required for good results.

The amount of sodium carbonate and sodium nitrate which I prefer to use, viz:

10 parts $Na_2CO_3$ } to 100 parts $ZrO_2$
2.5 parts $NaNO_3$ } was carefully worked out and represents a safe working condition.

The preferred range may be described as a mixture containing either sodium nitrate or sodium carbonate, or mixtures of same, in amounts to yield from about 5% to 12% of $Na_2O$ in the roast after heating but before water leaching.

The range as defined in terms of raw charge mixtures may be based on Examples H to K inclusive as the preferred range, with the outside range as set forth in Examples E, F and G.

In this table I have simplified matters by including the small amounts $TiO_2$, $Fe_2O_3$, $Al_2O_3$, ignition loss, etc. in the $ZrO_2+$ figures given.

The opacity readings refer to the standard test procedure I have described and are comparable strictly with Examples A, B, C and D already stated, as regards all testing details in enameling.

The temperature range is preferably from 800° to 950° C.

Microscopic examination of the roast Example B, shows that the product consists mainly of $ZrO_2$ and in addition contains about 3% of sodium zirconium silicate ($Na_2ZrSiO_5$) and about 8% sodium silicate ($Na_2SiO_3$).

Since neither sodium zirconium silicate or sodium silicate are good mill addition opacifiers, one of the objects of my invention is to eliminate the presence of either of these compounds insofar as practical by initially eliminating the silica.

In any case the roasting with the alkali-metal compounds as hereinbefore described not only serves to destroy objectionable dark colored impurities such as present in the starting material used of Examples B and C, but also serves to alter the physical structure and properties of the zirconia so as to enable same after such treatment to produce results in respect to vitreous enamel opaquing hitherto unknown in mill added zirconium products while also producing enamels of brilliant lustre and good color.

I claim as my invention:

1. The method of making a vitreous enamel white opacifying composition from a zirconium oxide compound which comprises mixing said zirconium compound with an alkali-metal reagent in a ratio not to exceed 4 parts of said reagent to 10 parts $ZrO_2$ in said compound, and roasting said mixture, but without fusion, at temperatures from 800° to 950° C. to convert said compound into the zirconium oxide opacifying composition.

2. The method of making a vitreous enamel white opacifying composition from a zirconium oxide compound which comprises mixing said zirconium compound with sodium nitrate in a ratio not to exceed 4 parts of said sodium nitrate to 10 parts ZrO₂ in said compound, and roasting said mixture, but without fusion, at temperatures from 800° to 950° C. to convert said compound into the zirconium oxide opacifying composition.

3. The method of making a vitreous enamel white opacifying composition from zirconium oxide which comprises mixing said zirconium oxide with an alkaline sodium salt in a ratio not to exceed 4 parts of said salt to 10 parts of said oxide, roasting said mixture, but without fusion, for about four hours at temperatures from 800° to 950° C., and water-washing the roast to remove soluble compounds from the residual zirconium oxide opacifying composition.

4. The method of making a vitreous enamel white opacifying composition from zirconium oxide which comprises mixing said zirconium oxide with a mixture of sodium carbonate and a less amount of sodium nitrate in a ratio not to exceed 4 parts of said sodium compounds to 10 parts ZrO₂ in said oxide, roasting said mixture, but without fusion, for about four hours at temperatures from 800° to 950° C., and water-washing the roast to remove soluble compounds from the residual zirconium oxide opacifying composition.

5. The method of making vitreous enamel white opacifying composition from a zirconium oxide compound obtained from high temperature decomposition of zircon not in intimate contact with carbon in an electric resistance furnace with substantially complete expulsion of silicon and iron compounds, which comprises intimately mixing said zirconium compound with a lesser amount of an alkali-metal reagent in a ratio not to exceed 4 parts of said reagent to 10 parts ZrO₂ in said compound, and then roasting said mixture, but without fusion, at temperatures from 800° to 950° C. for about four hours to convert said compound into the zirconium oxide opacifying composition.

6. In the method of making a vitreous enamel white opacifying composition from a zirconium compound containing more than 99.50% ZrO₂, the steps which comprise roasting a mixture of said zirconium compound and a lesser amount of an alkaline sodium salt in a ratio not to exceed 4 parts of said salt to 10 parts ZrO₂ in said zirconium compound at temperatures from 800° to 950° C. to decompose the charge but without fusion, and then water-washing the roast to remove soluble compounds from the residual zirconium oxide opacifying composition.

7. In the method of making a zirconium oxide opacifier from an oxidized zirconium cyanonitride, the step which consists in roasting an intimate mixture of said oxidized cyanonitride with a lesser amount of an alkaline sodium salt in a ratio not to exceed 4 parts of said salt to 10 parts ZrO₂ in said zirconium compound at temperatures from 800° to 950° C. to form the zirconium oxide opacifier containing less than 5 percent of silica and silicates.

8. In the method of making a zirconium oxide opacifier from a calcined oxidized zirconium carboxide, the step which consists in roasting an intimate mixture of the zirconium compound derived from said carboxide with a lesser amount of an alkaline sodium salt in a ratio not to exceed 4 parts of said salt to 10 parts ZrO₂ in said zirconium compound for about four hours at temperatures from 800° to 950° C. to form the zirconium oxide opacifier containing more than 90 percent ZrO₂.

9. In the method of making a vitreous enamel white opacifying composition from a zirconium compound obtaining by calcining to oxidation a zirconium carboxide, the steps which consist in roasting an intimate mixture of said zirconium compound with a lesser amount of an alkaline sodium salt in a ratio not to exceed 4 parts of said salt to 10 parts ZrO₂ in said zirconium compound for about four hours at temperatures from 800° to 950° C. to decompose the charge but without fusion, and then water-washing the roast to remove soluble compounds from the residual zirconium oxide opacifying composition.

10. An anhydrous water-washed vitreous enamel white opacifying composition consisting of a powdered mixture of more than 85 percent zirconium oxide and not to exceed 8 percent sodium silicate and not to exceed 5 percent sodium zirconium silicate.

11. An anhydrous water-washed zirconium oxide vitreous enamel white opacifying composition containing zirconium oxide from 85 to 98 percent and with ½ to 5% Na₂O chemically combined therein as sodium silicate and sodium zirconium silicate with traces of titanium and iron compounds.

CHARLES J. KINZIE.